United States Patent
Goebert et al.

(10) Patent No.: US 8,544,249 B2
(45) Date of Patent: Oct. 1, 2013

(54) MOWER DECK LEVEL GAUGE AND PROCEDURE

(75) Inventors: Barry Joseph Goebert, Beaver Dam, WI (US); Eugene Gary Hayes, Beaver Dam, WI (US); Cindy Louise Weber, Cedarburg, WI (US); Stephen Lee Propson, Brownsville, WI (US); Steven Henry Buss, Horicon, WI (US)

(73) Assignee: Deere & Company, Moline, IL (US)

( * ) Notice: Subject to any disclaimer, the term of this patent is extended or adjusted under 35 U.S.C. 154(b) by 1980 days.

(21) Appl. No.: 11/125,777

(22) Filed: May 10, 2005

(65) Prior Publication Data

US 2006/0254236 A1    Nov. 16, 2006

(51) Int. Cl.
*A01D 34/00* (2006.01)
(52) U.S. Cl.
USPC .............................. 56/17.2; 56/17.1; 56/320.1
(58) Field of Classification Search
USPC ....... 56/14.7, 14.9, 15.3, 17.1, 17.2, DIG. 22, 56/15.2; 73/1.01; 16/111.1, 415–420, 903; 81/177.4, 490, 437–439
See application file for complete search history.

(56) References Cited

U.S. PATENT DOCUMENTS

| | | | | |
|---|---|---|---|---|
| 896,121 | A | * | 8/1908 | Latimer .............................. 81/20 |
| 1,502,075 | A | * | 7/1924 | Weaver ............................ 33/567 |
| 2,500,313 | A | * | 3/1950 | Harrington ...................... 33/567 |
| 2,536,401 | A | * | 1/1951 | Victor .............................. 33/567 |
| 2,933,874 | A | * | 4/1960 | Sonmore et al. ............. 56/320.2 |
| 3,526,083 | A | * | 9/1970 | Watson et al. ................. 56/10.7 |
| 3,874,150 | A | | 4/1975 | Boeck ............................ 56/17.1 |
| 4,441,306 | A | * | 4/1984 | Kuhn .............................. 56/15.9 |
| 5,526,633 | A | | 6/1996 | Strong et al. ................... 56/17.2 |
| 6,038,841 | A | | 3/2000 | Bates, Jr. et al. ............... 56/15.8 |
| 6,195,969 | B1 | * | 3/2001 | Yilmaz .......................... 56/14.7 |

OTHER PUBLICATIONS

*Blade Height Gauge*; 2004 Honda Lawn Tractor website (www.Hondapowerequipment.com).
*AM130907 Leveling Gauge for Mower Deck Blade Height*: retrieved Apr. 2005 from Deere & Company website (www.greenfunstore.com/browseproducts).

* cited by examiner

*Primary Examiner* — Alicia Torres

(57) ABSTRACT

A mower deck level gauge and procedure are provided to level and align a mower deck suspended from a vehicle and covering at least one rotary cutting blade. The mower deck has a deck height adjustment control indicating the cutting height, and the rim of the mower deck has deck level measuring points marked thereon, and a bracket at the front of the mower deck having a deck level measuring point marked thereon. A one-piece gauge is dimensioned to fit under each deck level measuring point at a specified cutting height.

7 Claims, 4 Drawing Sheets

MOWER DECK LEVEL GAUGE AND PROCEDURE

FIELD OF THE INVENTION

This invention relates to mower decks suspended from lawn and garden tractors and other grass mowing machines, and more specifically to a gauge to properly level and align a mower deck at a specified cutting height, and a procedure for its use.

BACKGROUND OF THE INVENTION

A mower deck may be suspended from a lawn and garden tractor or other vehicle, or "floated" on wheels attached to the mower deck. The mower deck may cover one or more rotary cutting blades. When a mower deck is suspended from a vehicle frame, the mower deck and blades should be in proper alignment relative to the mowing vehicle at all cutting heights. For example, the mower deck should be properly aligned so that each rotary cutting blade is level side-to-side, and has a slight forward angle or "rake." Proper alignment of the mower deck helps achieve better cut quality, prevents grass frazzling, provides better grass dispersal, better bagging results, and reduces the power required to run the engine. Additionally, the mower deck should be calibrated so that the blades are at the cutting height specified by the mower deck height control knob or lever.

To determine if a mower deck is level and properly aligned at a designated cutting height, several measurements may be taken. Typically, measurements can be taken from a hard, level floor or ground surface under the vehicle up to the tip of a rotary cutting blade. To check if the mower deck is level side-to-side, the blades are manually rotated to a position parallel to the vehicle axle and measurements are taken from the ground up to the left and right outside blade tips. The blades may be considered level side-to-side if the left and right measurements are within about ⅛ inch of each other. To check if the mower deck is properly aligned front-to-rear, the blades are rotated to point straight forward and backward, and measurements are taken from the ground up to the front and rear blade tips. The blades are considered properly aligned front-to-rear if the front blade tip is about ⅛ inch to about ½ inch lower than the rear blade tip. This may be referred to as "rake."

After the measurements, one or more adjustments may be made on the linkages between the mower deck and vehicle frame. For example, to level the mower deck side-to-side, a nut or other connector on the left-hand lift link may be turned to raise or lower the left side of the mower deck. Similarly, to properly align the mower deck front-to-rear, yokes or other connectors between the front of the mower deck and vehicle frame may be rotated in either direction to lift or lower the front of the mower deck. Additionally, linkages may be adjusted so that the height of the cutting blades corresponds to the cutting height designated on the mower deck height control knob or lever. The measuring process may need to be repeated again to calibrate the deck height control knob or lever; i.e., to insure that the final cutting height is the same as the height specified on the deck height control.

In the past, leveling gauges have existed for measuring the height of the blade from the floor. For example, leveling gauges such as those available from Deere & Company of Moline, Ill. may include a pivoting arm attached to a base with a height scale. The base of the gauge may be positioned on the floor, and one end of the arm may be pivoted until it contacts the blade tip. The other end of the arm points to the height scale, indicating the height from the floor up to the mower blade tip.

Other gauges are used to measure blade height by marking a clay column with the blade tip. For example, gauges such as those available from Honda include a clay column mounted on a base that may be positioned on the floor. The tip of the mower blade is turned manually to mark the clay column. A height scale next to the column indicates the blade height.

Gauges such as those described above are inconvenient, cumbersome and difficult to read. Mower deck leveling gauges and procedures for their use require reaching under the mower deck to manually orient and measure the height of the blade or blades. The measuring process may be so difficult that it may be neglected, resulting in uneven cutting problems. A convenient and simple mower deck leveling gauge is needed. A leveling gauge and procedure for its use is needed to reduce, minimize or eliminate the necessity of reaching under a mower deck.

SUMMARY OF THE INVENTION

A convenient and simple mower deck leveling gauge and procedure are provided. The gauge is dimensioned to fit under the outer rim of a mower deck at specified, marked, sequential locations. The gauge measures the deck height at each of the marks, which may be slightly less than the designated cutting height. The gauge may be stored in an opening or recess in the mower deck height control knob.

DESCRIPTION OF THE PREFERRED EMBODIMENT

Figure 1:
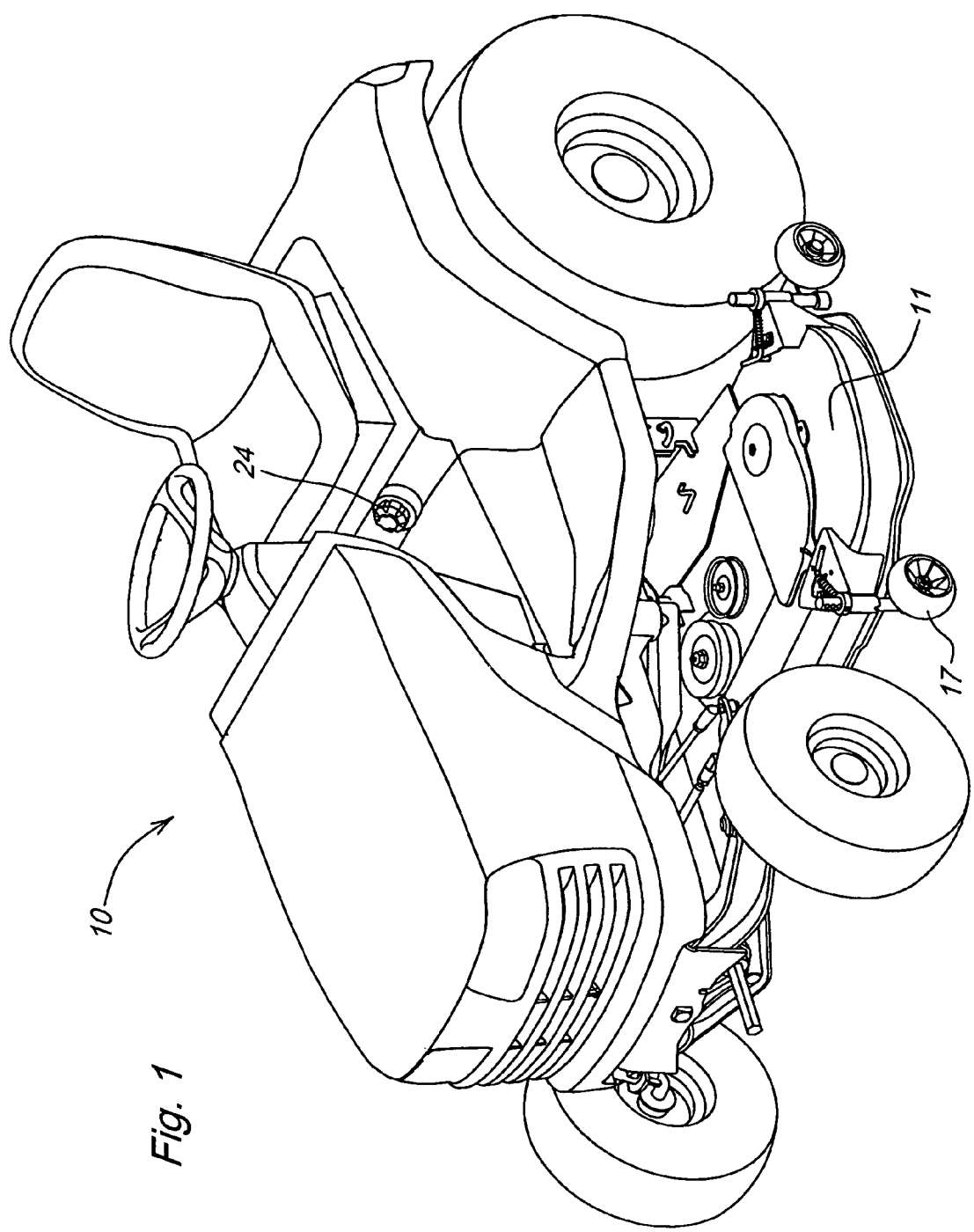
FIG. 1 is a perspective view of a lawn and garden tractor with a mower deck and deck level gauge according to one embodiment of the invention.
Figure 5:
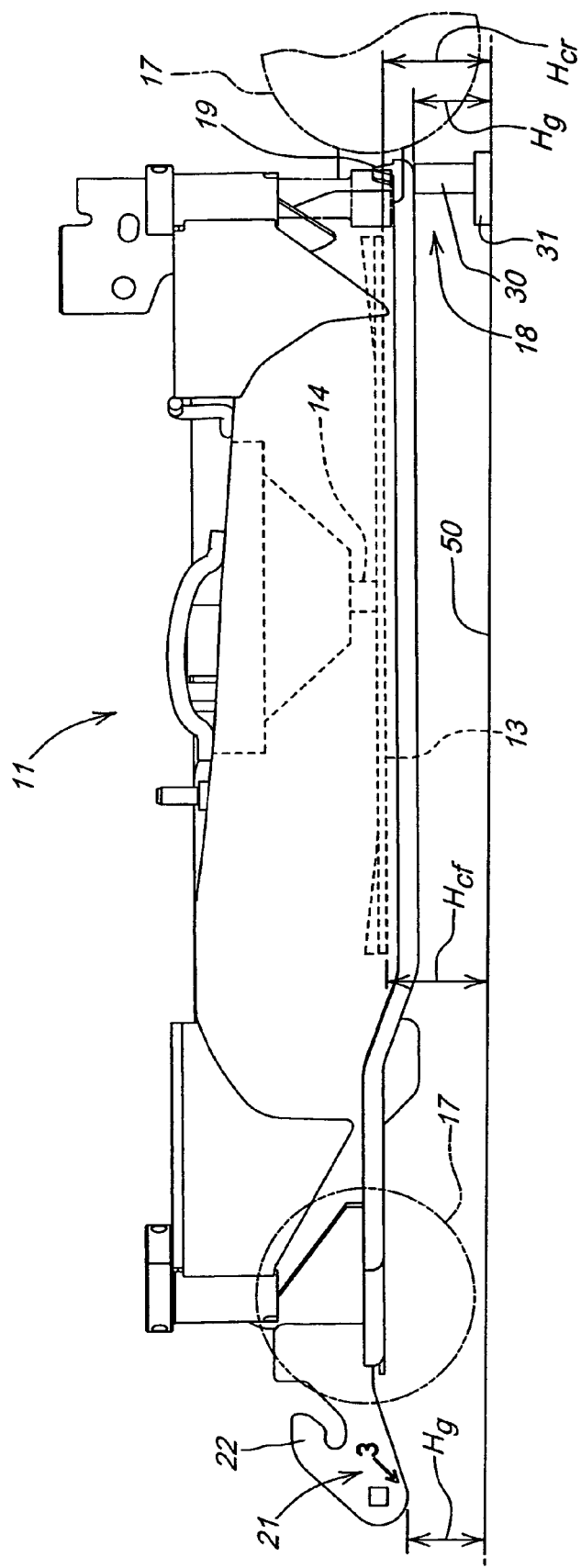
FIG. 5 is a side section view of a mower deck and mower deck level gauge of the first embodiment.

FIG. 1 shows lawn and garden tractor 10 having mower deck 11 suspended from the vehicle between the front and rear wheels. Optionally, the mower deck may have anti-scalp wheels 17. The wheels should be between about ¼ inch and about ½ inch above the ground surface when mowing. As shown in FIG. 5, mower deck 11 may cover one or more rotary cutting blades 13 on generally vertical shafts 14 driven by an engine drive shaft and a belt and pulley arrangement (not shown).

Figure 2:
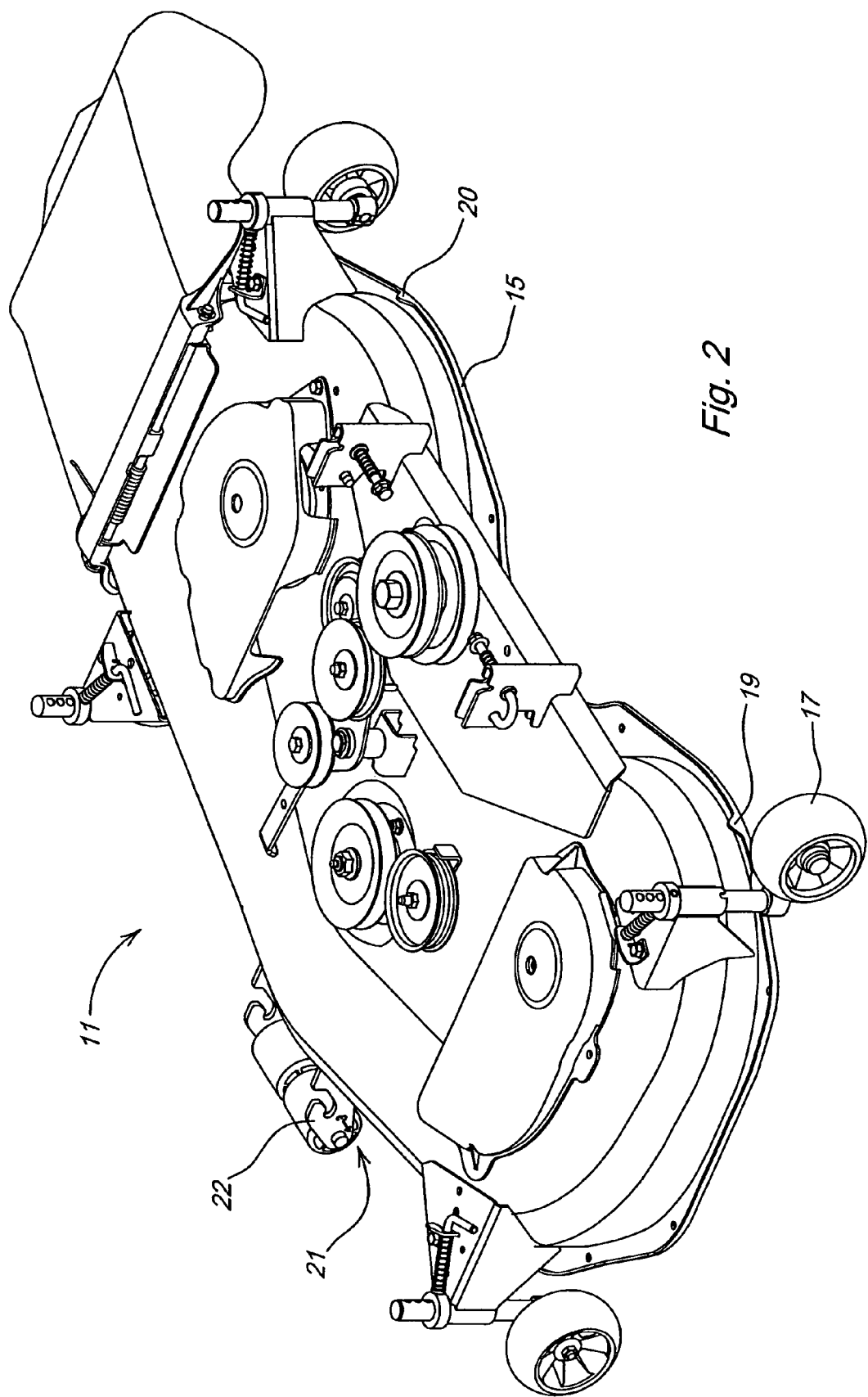
FIG. 2 is a perspective view of a mower deck that may be used with the mower deck level gauge in a first embodiment.

Now referring to FIG. 2, in one embodiment, mower deck 11 may have a rolled outer rim 15 around its outer perimeter. The mower deck may be marked at predetermined measuring points 19, 20, 21 on or adjacent outer rim 15. The marks specify where the mower deck level gauge may be placed to level and properly align the mower deck. Optionally, one or more of the marks may be numbered or labeled to indicate a preferred measuring sequence.

In one embodiment, the first two marks 19, 20 may be located on the outer rim or perimeter of the mower deck, at or near the left rear and right rear of the perimeter. For example, the first two marks may be raised steel tabs formed into the outer rim of the mower deck. The third mark 21 may be stamped or printed on bracket or projection 22 at or extending from the front of the mower deck, and preferably about ⅛ inch to about ½ inch over the outer rim at the front of the deck. For example, the third mark may include the numeral 3 and an arrow directing the operator to a location on bracket or projection 22.

In one embodiment, marks 19, 20, 21 may be positioned so that when the deck is level and properly aligned, the deck will have a forward rake, as shown in FIG. 5. Thus, when a mower blade or blades are aligned with the longitudinal axis of the vehicle, the front tip of the blade may have a cutting height $H_{cf}$ about ⅛ to about ½ inch less (closer to ground surface 50) than the cutting height $H_{cr}$ of the rear blade tip. The gauge and method may be used to provide a desired forward rake.

Figures 3, 4:
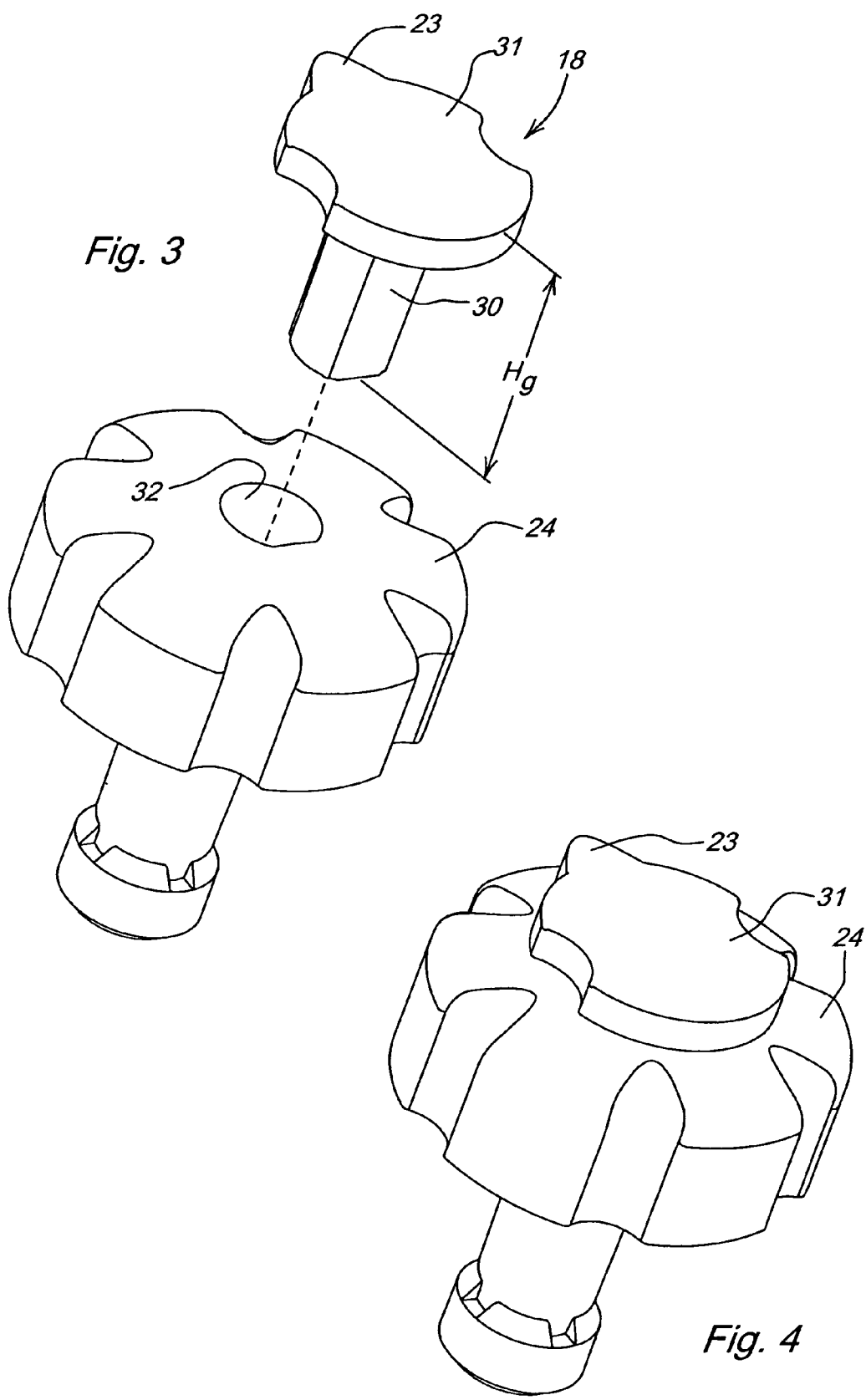
FIG. 3 is a side perspective view of a first embodiment of the mower deck level gauge and a deck height adjustment knob for storage of the gauge.
FIG. 4 is a side perspective view of the mower deck level gauge stored in the deck height adjustment knob.

Now referring to FIGS. 3 and 4, in one embodiment, mower deck level gauge 18 may be a one-piece plastic component, or other similar material that is light in weight and rigid. The one-piece gauge may include post 30 extending from and connected to base 31. The base may have a diameter of at least about two inches. When the base of the gauge is placed on the ground, the base supports the post in a generally vertical orientation, as shown in FIG. 5. When the base is placed on the ground, the end of the post should just touch the mower deck at each of the specified marks 19, 20, 21, to indicate that the mower deck is properly aligned and leveled.

In one embodiment, when mower deck level gauge 18 is not in use, it may be stored in a recess or opening in the lawn and garden tractor adjacent the mower deck. For example, the mower deck level gauge may be stored in opening 32 in deck height adjustment control knob 24. Additionally, the base of the gauge may include a pointer 23 that may be positioned along with the deck height adjustment control knob to point to a specified cutting height.

In one embodiment, gauge 18 may be dimensioned to fit into a recess or opening 32 adjacent the mower deck, and preferably in mower deck height adjustment control knob 24. The recess or opening 32 in the deck height adjustment control knob may provide a storage location for the gauge that also allows the gauge to remain visible to the operator. Storing the gauge in the deck height adjustment knob provides a simple reminder for the operator to follow a specified procedure to level and align the mower deck. Additionally, the storage location helps prevent misplacement of the gauge and assures that the gauge remains attached to the vehicle.

In one embodiment, the height of the gauge ($H_g$) is the combined height of the post and base of the gauge. The height of the gauge may be slightly less than the designated cutting height at the deck level position. The gage should be dimensioned to just fit under the mower deck at the measuring marks when the mower deck is level and aligned at the cutting height designated for the gauge. Optionally, the designated cutting height for a particular gauge may be indicated on the lawn and garden tractor as the "deck level" position.

For example, as shown in FIG. 5, the gauge height ($H_g$) may be about 1½ inches, while the cutting height at the front tip of the blade ($H_{cf}$) may be about 1¾ inches. Thus, the gauge height ($H_g$) may be slightly less than the cutting height ($H_{cf}$) of the front blade tip. The gauge may be dimensioned to correspond to the correct height of the mower deck, which may extend about ¼ to ½ inch below the cutting edge of the rotary blades. Similarly, the gauge height ($H_g$) also may be less than the cutting height of the rear blade tip ($H_{cr}$).

In one embodiment, mower deck level gauge 18 may be used in accordance with the following procedure. First, the mower deck may be raised or lowered to a designated cutting height that is specified for the particular gage. For example, the designated cutting height may be the cutting height at the front blade tip ($H_{cf}$). The cutting height may be specified using cutting height control knob 24. This also may be referred to as the "deck level" position.

For example, if the designated cutting height for the front blade tip ($H_{cf}$) is 1¾ inches, it may correspond to a gauge having a height ($H_g$) of 1½ inches. The gauge may be placed sequentially under the mower deck at each of the three marks. At each mark, the gauge indicates if the mower deck is at the necessary level for the designated cutting height.

More specifically, in one embodiment, gauge 18 may be used to level and align a mower deck having three marks. The mower deck may be set at a designated cutting height, or deck level position, such as 1¾ inches. Gauge 18, which has a height ($H_g$) of 1½ inches, may be placed under the mower deck at the specified first mark 19, which may be at the left rear outer rim of the deck. For the designated 1¾ inch cutting height, the first mark on the mower deck should be 1½ inches from the ground. If the 1½ inch gauge does not slip under the mower deck at the first mark, or there is a gap, the mower deck linkages may be adjusted until the gauge just slips under the mower deck.

Next, gauge 18 may be placed under the mower deck at the specified second mark 20, which may be at the right rear outer rim of the deck. For the 1¾ inch cutting height, the second mark on the mower deck also should be 1½ inches from the ground. If the 1½ inch gauge does not slip under the mower deck or there is a gap at the second mark, the linkages may be adjusted until the gauge fits.

Finally, gauge 18 may be placed under bracket or projection 22 which specifies the third mark 21 at the front of the mower deck. For the 1¾ inch cutting height, the third mark also should be 1½ inches from the floor. However, the front of the deck should be slightly lower than the rear of the deck, which is referred to as "rake." The same 1½ inch gauge may be used to provide the desired rake, so the third mark may be on a bracket or projection that is slightly above the outer rim of the deck. If the gauge does not slip under the bracket or projection at the third mark, or there is a gap, the linkages may be adjusted until the gauge slips between the ground and the bracket or projection at the third mark.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. An apparatus comprising:
   a mower deck suspended from a vehicle and having an outer rim and at least one rotary cutting blade;
   a deck height adjustment control knob having a rotational axis and indicating a cutting height for the at least one rotary cutting blade;

a plurality of deck level measuring marks spaced around the mower deck; and a one-piece gauge dimensioned to fit between a ground surface and each deck level measuring mark at a cutting height designated as a deck level position, the gauge having a post extending from and connected to a base, the post insertable when not in use into an opening that is coaxial with the rotational axis of the deck height adjustment control knob, and the base providing a cutting height indicator outside the opening.

2. The apparatus of claim 1 wherein the gauge has a base and a post with a smaller cross section extending from the base.

3. The apparatus of claim 1 wherein the one-piece gauge is shorter than the specified cutting height.

4. A method to level and align a mower deck, comprising the steps of:

placing a mower deck cutting height control at a designated cutting height;

inserting a one-piece gauge under the mower deck at a first measuring mark on the deck;

adjusting a linkage to the mower deck until the level of the mower deck corresponds to the gauge height at the first measuring mark;

inserting the gauge under the mower deck at a second measuring mark on the deck;

adjusting a linkage to the mower deck until the level of the mower deck corresponds to the gauge height at the second measuring mark;

inserting the gauge under the mower deck at a third measuring mark on a bracket at the front of the deck; and adjusting a linkage to the mower deck until the level of the mower deck corresponds to the gauge height at the third measuring mark.

5. The method of claim 4 wherein the marks are numbered sequentially on the mower deck.

6. The method of claim 4 further comprising setting the cutting height control to a cutting height greater than the height of the gauge.

7. The method of claim 4 further comprising adjusting the mower deck until the level of the mower deck corresponding to the gauge height at the third measuring mark aligns the mower deck to have a forward rake.

* * * * *